C. O. GARDINER.
HARVESTER FRAMES.

No. 184,856. Patented Nov. 28, 1876.

Attest:
Clarence Poole
Robt. Herman

Inventor:
Chas. O. Gardiner
By his atty
R. D. Smith

UNITED STATES PATENT OFFICE.

CHARLES O. GARDINER, OF SPRINGFIELD, OHIO.

IMPROVEMENT IN HARVESTER-FRAMES.

Specification forming part of Letters Patent No. 184,856, dated November 28, 1876; application filed March 23, 1876.

*To all whom it may concern:*

Be it known that I, CHARLES O. GARDINER, of Springfield, in the county of Clarke and State of Ohio, have invented a new and useful Improvement in Harvester-Frames, of which the following is a full, clear, and exact description, reference being had to the accompanying drawings, wherein—

Figure 1:
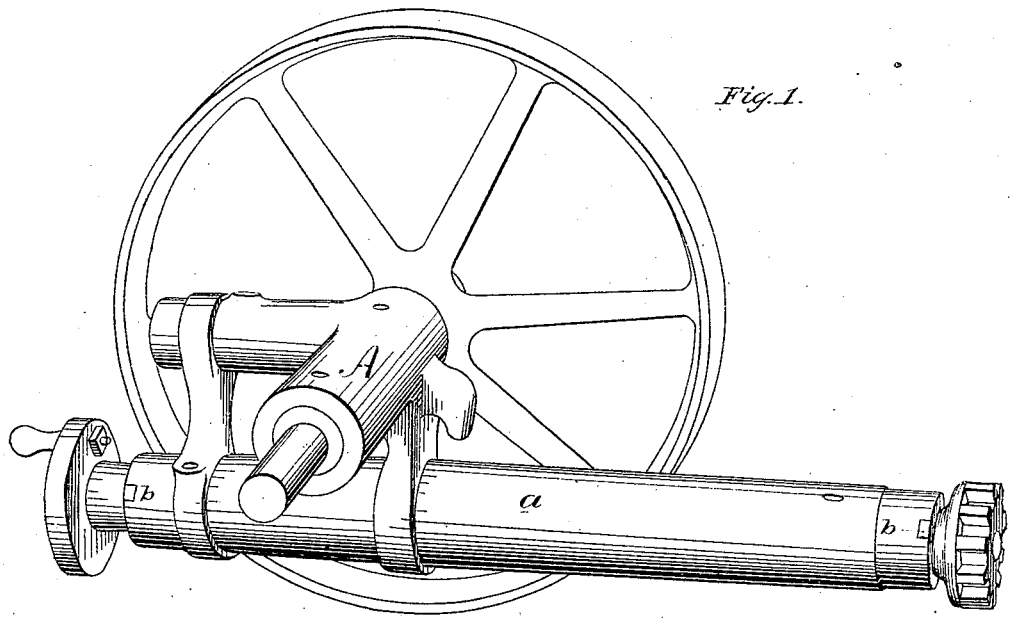
Figure 2:
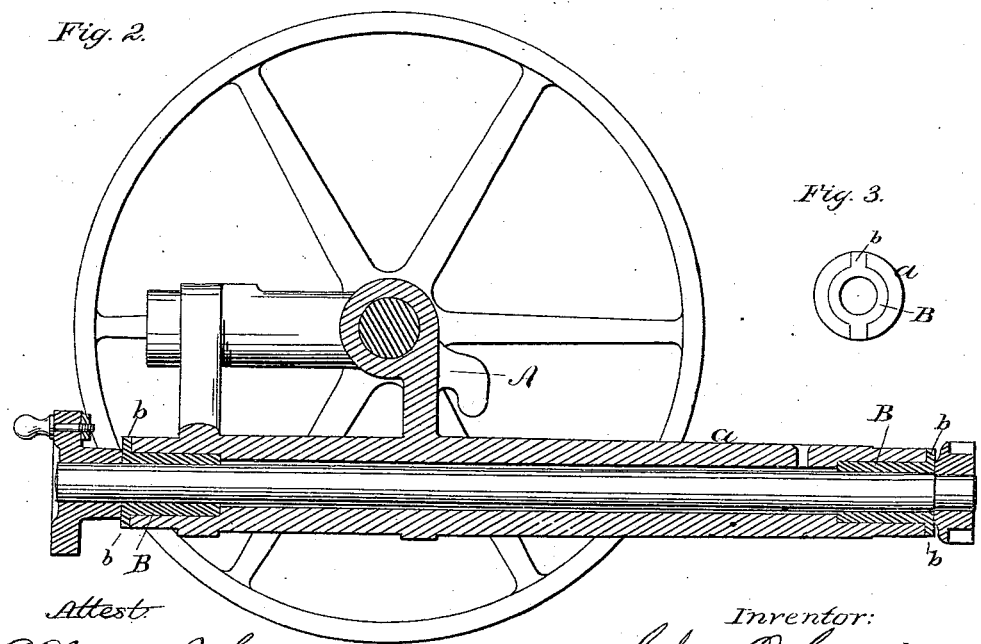
Figure 3:
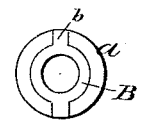

Figure 1 is a perspective view of my frame, the near wheel having been removed. Fig. 2 is a longitudinal section of the shaft-bearing sleeve or tube.

In the manufacture of cast-metal harvester-frames having tubular sleeves, in which the shafts of the machines have their bearings or support, it has heretofore been the practice to form these bearings directly in the metal frame itself, and in the use of these frames, in consequence of their exposure to the elements, the conditions under which they are used, exposing the journal-bearings to the dust or grit arising from the grass or grain upon which they operate, the hurry of the harvest season, and the consequent liability to neglect oiling said bearings, it is found in many cases that these bearing speedily become so worn as to permit the shafts to wabble in such a manner as to seriously impair the efficiency of the machine, and this wabbling, constantly and rapidly increasing, soon results in the destruction of the frame, necessitating its replacement at considerable expense, or the purchase of a new machine.

The object of the present invention is to overcome these difficulties by supplying the tubular metal frame with removable thimble-bearings, which, when they become worn sufficiently in any way to impair the efficiency of the machine or interfere with its proper working, can readily be driven out or removed and their places supplied by new ones, virtually restoring the machine to the condition of a new machine, and this at a comparatively trifling expense.

To enable others to understand and apply my invention, I will proceed to describe the same with reference to the drawings.

A is a cast-metal harvester-frame, with the long tubular shaft-cover a, provided with the removable thimble bearings or bushings B, the interior surfaces of which are bored to fit the shaft or axle for which they serve as boxes. The ends of the sleeve a are preferably bored to receive the boxes B, and the same may be kept from turning by small splines or projections b, fitted to corresponding recesses in the sleeve a.

If desirable, as it may sometimes be, the boxes or bushes B may be made in two parts, set together and retained by screws through the sleeve a; but generally I prefer them to be simply tubular, as shown.

The thimbles or bushings B being made uniform in size for their respective places in the machine, when one is removed it may be readily replaced by a new one corresponding to the old one removed, and a farmer or operator supplied with a few extra thimbles is enabled to keep his machine in constant repair at a very moderate expense.

Having described my invention, what I claim as new is—

A metal harvester-frame provided with removable thimble-bearings for the shafts mounted therein, substantially as and for the purpose set forth.

CHARLES O. GARDINER.

Witnesses:
 JOHNSON MORTON,
 WILLIAM A. SCOTT.